United States Patent
Kim et al.

(10) Patent No.: US 7,920,826 B2
(45) Date of Patent: Apr. 5, 2011

(54) METHOD OF FORMING FRAME IN MULTI-HOP RELAY SYSTEM AND SYSTEM FOR IMPLEMENTING THE METHOD

(75) Inventors: Ki Seok Kim, Gyeongju (KR); Seok Jin Lee, Daejeon (KR); Young Il Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 736 days.

(21) Appl. No.: 11/930,514

(22) Filed: Oct. 31, 2007

(65) Prior Publication Data
US 2008/0113616 A1 May 15, 2008

(30) Foreign Application Priority Data

Nov. 10, 2006 (KR) .................. 10-2006-0111272
Sep. 14, 2007 (KR) .................. 10-2007-0093813

(51) Int. Cl.
*H04B 7/14* (2006.01)
(52) U.S. Cl. ............ 455/16; 455/11.1; 455/7; 455/13.1; 455/500; 370/297; 370/315
(58) Field of Classification Search .............. 455/7, 517, 455/11.1, 435.1, 444, 13.1; 370/310, 311, 370/315, 328, 329, 338, 401, 297, 345; 375/267
See application file for complete search history.

(56) References Cited

U.S. PATENT DOCUMENTS

| 2006/0003696 A1* | 1/2006 | Diaz Cervera et al. ...... 455/11.1 |
| 2007/0081483 A1* | 4/2007 | Jang et al. ...................... 370/315 |
| 2007/0082621 A1* | 4/2007 | Lee et al. ......................... 455/69 |
| 2007/0091805 A1* | 4/2007 | Ramprashad et al. ..... 370/230.1 |
| 2008/0090575 A1* | 4/2008 | Barak et al. ................... 455/444 |
| 2008/0159186 A1* | 7/2008 | Steer ............................. 370/297 |
| 2008/0285500 A1* | 11/2008 | Zhang et al. .................. 370/315 |
| 2009/0133105 A1* | 5/2009 | Larsen .............................. 726/5 |

FOREIGN PATENT DOCUMENTS

| KR | 1020030057467 A | 7/2003 |
| KR | 1020050022348 | 3/2005 |
| KR | 1020050049456 | 5/2005 |

* cited by examiner

*Primary Examiner* — Tan Trinh
(74) *Attorney, Agent, or Firm* — Ladas & Parry LLP (57) ABSTRACT

A method of forming a frame in a Mobile Multi-hop Relay (MMR) system, and a system for implementing the method are provided. In a multi-hop relay system, when a relay station of a specific layer receives data, the relay station receives data from both a higher layer and a lower layer. When the relay station transmits data, the relay station transmits data to both the higher layer and the lower layer. By doing so, data reception and data transmission are exclusively performed without interfering with each other, and the method and the system are easily applied to the multi-hop MMR system.

9 Claims, 7 Drawing Sheets

METHOD OF FORMING FRAME IN MULTI-HOP RELAY SYSTEM AND SYSTEM FOR IMPLEMENTING THE METHOD

CROSS-REFERENCE TO RELATED PATENT APPLICATION

This application claims the benefit of Korean Patent Application Nos. 10-2006-0111272, filed on Nov. 10, 2006, and 10-2007-0093813, filed on Sep. 14, 2007 in the Korean Intellectual Property Office, the disclosures of which are incorporated herein their entirety by reference.

BACKGROUND OF THE INVENTION

1. Field of the Invention

The present invention relates to a framestructure of transmitting and receiving data in a Mobile Multi-hop Relay (MMR) system, and more particularly, to a method of forming the framestructure for transmitting and receiving data between a base station and a relay station, or between relay stations in a multi-hop MMR system including three or more hops.

The present invention is derived from research which was supported by the 'Information Technology (IT) Research and Development Program' of the Ministry of Information and Communications (MIC)/the Institute for Information Technology Advancement (IITA), Republic of Korea. The project management No. is '2006-S-011-01, and the title is 'Development of relay/mesh communication system for multi-hop WiBro'.

2. Description of the Related Art

A conventional type of a relay station in a general mobile communication system receives a signal from a base station, and re-transmits a signal to a terminal. Since the relay station receives the signal from the base station and simultaneously re-transmits the signal to the terminal within a range of the relay station, two Radio Frequency (RF) devices are required.

For the conventional type of relay station in the general mobile communication system, much effort and high costs are required so as to add an interference cancellation function for canceling a reverse-flowed signal from among signals being re-transmitted to a terminal, or to a relay station of a lower layer, wherein the signals are from among signals being received from the base station.

A Mobile Multi-hop Relay (MMR) system demodulates/decodes a signal received from a base station, and then modulates/encodes the signal, thereby transmitting the signal to a terminal within a range of a relay station, or to a relay station of a lower layer, and it is not possible to form the MMR system with the conventional type of the relay station. Also, a frame formation would be too complicated to be applied to not only a two-hop MMR system but also to a multi-hop MMR system including three or more hops.

SUMMARY OF THE INVENTION

The present invention provides a method of forming a frame, and a system for implementing the method which can simplify a structure of a relay station device, and can be applicable to a multi-hop Mobile Multi-hop Relay (MMR) system.

According to an aspect of the present invention, there is provided a method of forming a frame of a relay station in a multi-hop relay system having a plurality of layers, the method including the operation of setting the frame of the relay station for one of a receive zone for simultaneously receiving data from a higher layer and a lower layer, and for a transmit zone for simultaneously transmitting data to the higher layer and the lower layer.

According to another aspect of the present invention, there is provided a relay station in a multi-hop relay system having a plurality of layers, the relay station setting a frame of the relay station for one of a receive zone for simultaneously receiving data from a higher layer and a lower layer, and for a transmit zone for simultaneously transmitting data to the higher layer and the lower layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention may be applicable to a multi-hop Mobile Multi-hop Relay (MMR) system, and may form a frame by which a first relay station receives a signal from a base station while simultaneously receiving a signal from a second relay station, and the first relay station transmits a signal to the base station while simultaneously transmitting a signal to the second relay station.

A structure of an MMR frame according to the present invention may simplify an implementation of a relay station, and may be applicable to not only a two-hop MMR system but also the multi-hop MMR system.

Hereinafter, a method of transmitting and receiving data in an MMR system, and a frame for the method will now be described more fully with reference to the accompanying drawings, in which exemplary embodiments of the invention are shown.

Figure 1A:
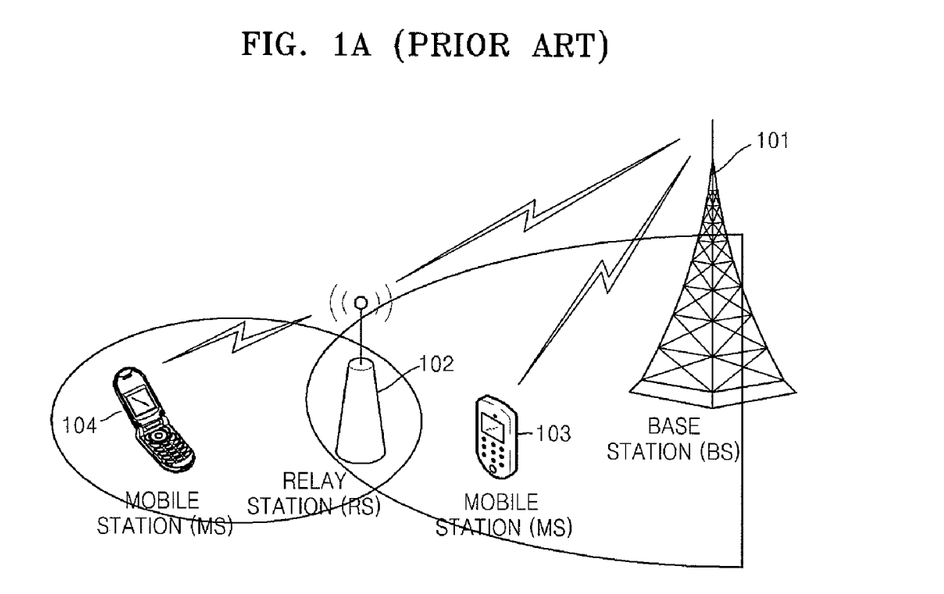
FIG. 1A is a diagram illustrating a two-hop Mobile Multi-hop Relay (MMR) system.
Figure 1B:
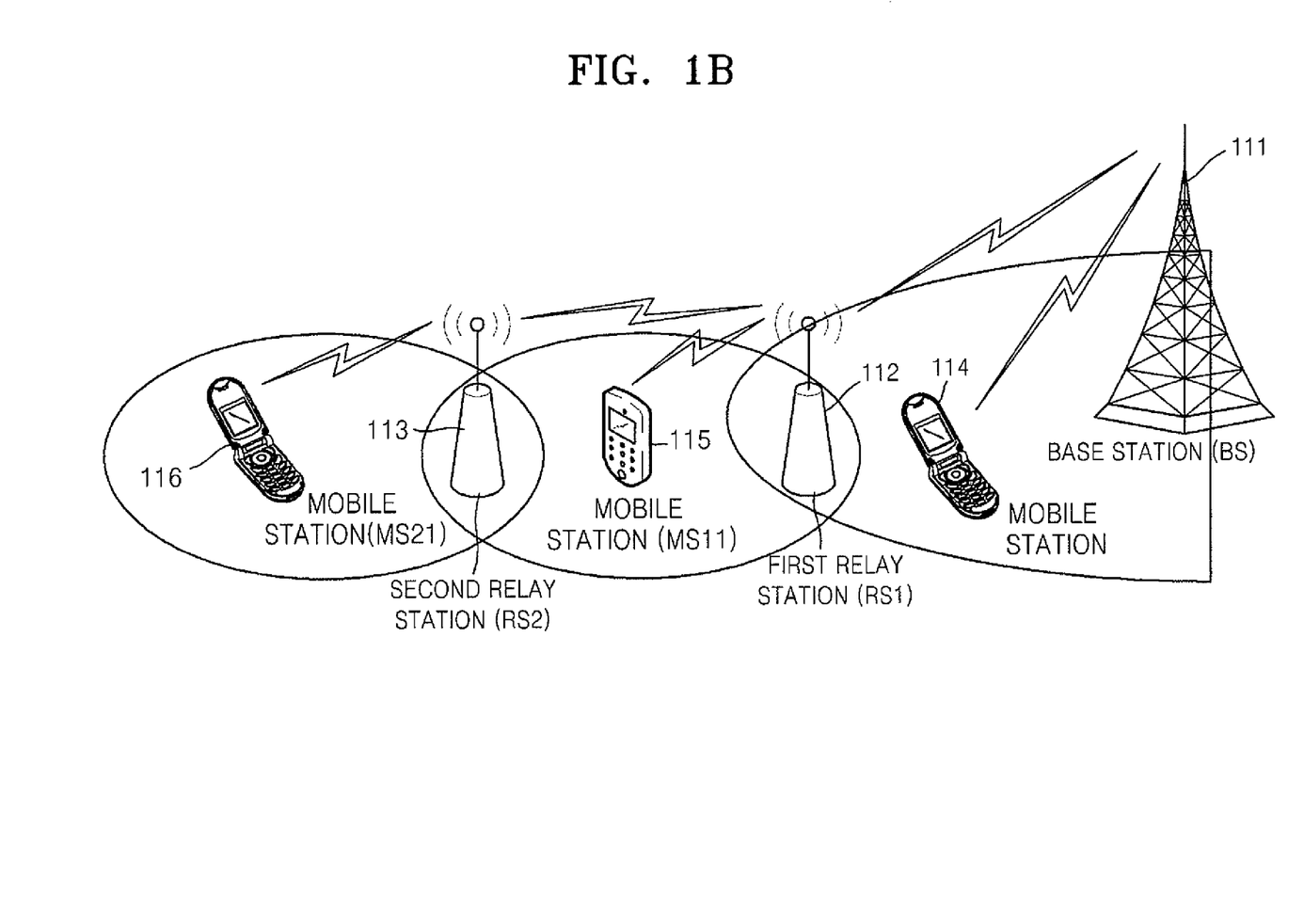
FIG. 1B is a diagram illustrating a multi-hop MMR system including three or more hops.

FIG. 1A is a diagram illustrating a two-hop MMR system, and FIG. 1B is a diagram illustrating a multi-hop MMR system.

FIG. 1A illustrates the two-hop MMR system formed of a first relay station 102 located at a layer 1 (hereinafter, referred to as 'a first relay station'). FIG. 1B illustrates the multi-hop MMR system including three or more hops in which there is a second relay station 113 located at a layer 2 (hereinafter, referred to as 'a second relay station'), or a relay station located at a layer lower than the layer 2.

The MMR systems of FIGS. 1A and 1B may include base stations 101 and 111, mobile stations (MSs) 103 and 114 within a range of the base stations 101 and 111, first relay stations 102 and 112, and mobile stations 104 and 115 within a range of the first relay stations 102 and 112.

In the case of the multi-hop MMR system, the second relay station 113 or/and other relay stations, and a mobile station 116 within a range of the second relay station 113 or/and other relay stations may be further included therein.

Referring to FIG. 1A, the first relay station 102 demodulates and decodes a signal received from the base station 101, and then encodes and modulates the decoded signal, thereby transmitting the encoded signal to the mobile station 104 within the range of the first relay station 102.

Also, the first relay station 102 receives a signal from the mobile station 104 within the range of the first relay station 102, demodulates and decodes the signal, and then encodes and modulates the decoded signal, thereby transmitting the encoded signal to the base station 101.

In the case of the multi-hop MMR system including three or more hops, referring to FIG. 1B, the first relay station 112 demodulates and decodes a signal received from the base station 111, and then encodes and modulates the decoded signal, thereby transmitting the encoded signal to the mobile station 115 within the range of the relay station 112, and to the second relay station 113 located at the layer 2 that is a lower layer.

Also, in the multi-hop MMR system, the first relay station 112 receives a signal respectively from the second relay station 113 and the mobile station 115, demodulates and decodes the signal, and then encodes and modulates the decoded signal, thereby transmitting the encoded signal to the base station 111.

Similarly to the first relay station 112, the second relay station 113 in the multi-hop MMR system demodulates and decodes a signal received from the first relay station 112, and then encodes and modulates the decoded signal, thereby transmitting the encoded signal to the mobile station 116, or to a relay station of a lower layer within a range of the second relay station 113.

Also, the second relay station 113 demodulates and decodes a signal received from the relay station of the lower layer, and then encodes and modulates the decoded signal, thereby transmitting the encoded signal to the first relay station 112.

A relay station in a conventional general mobile communication system receives a signal from a base station while simultaneously transmitting a signal to a mobile station or to a relay station of a lower layer, and thus two Radio Frequency (RF) devices are required.

Figure 2A:
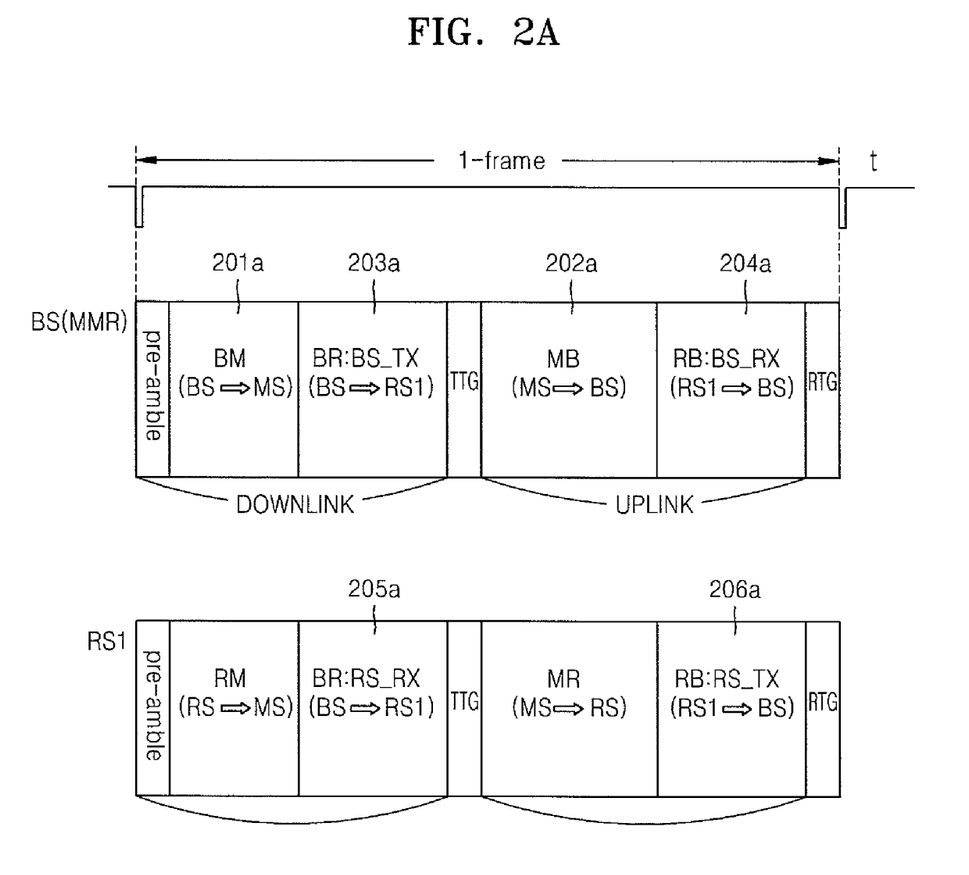
FIG. 2 is a diagram illustrating a basic frame structure used in an MMR system.
Figure 2B:
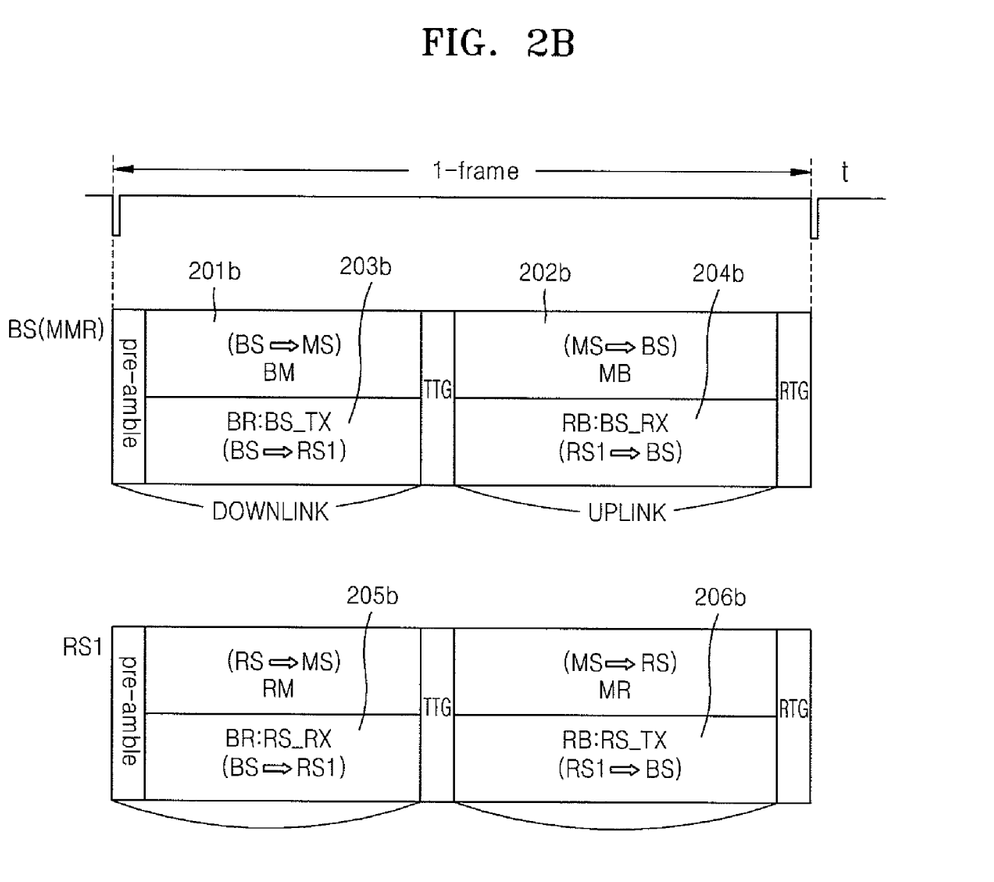

FIG. 2 is a diagram illustrating a basic frame structure used in a two-hop MMR system.

In general, a frame used in a Time Division Duplex (TDD) system is divided into a downlink zone in which a base station transmits a signal, and an uplink zone in which the base station receives a signal. The frame includes a TX/RX Transition Gap (TTG) zone for switching from the downlink to the uplink, and an RX/Tx Transition Gap (RTG) zone for switching from the uplink to the downlink. Also, a preamble is disposed at a head of the frame, wherein the preamble is for obtaining synchronization of a terminal, recognizing a base station, and setting synchronization by estimating a channel of a terminal.

When such a frame structure is applied to an MMR system, a zone in which the base station transmits a signal to a relay station, and a zone in which the relay station transmits a signal to the base station may be respectively added to the downlink zone and the uplink zone.

However, when the frame structure of the basic two-hop MMR system as illustrated in FIG. 2 is applied to a multi-hop MMR system, the frame structure will become complicated.

The present invention provides a method of transmitting and receiving data, and a framestructure by which a first relay station may receive a signal from a base station while simultaneously receiving a signal from a second relay station, and by which the first relay station may transmit a signal to the base station while simultaneously transmitting a signal to the second relay station in the multi-hop MMR system. By doing so, the method and the frame according to the present invention may be easily applied to not only the two-hop MMR system but also to the multi-hop MMR system.

Figure 3A:
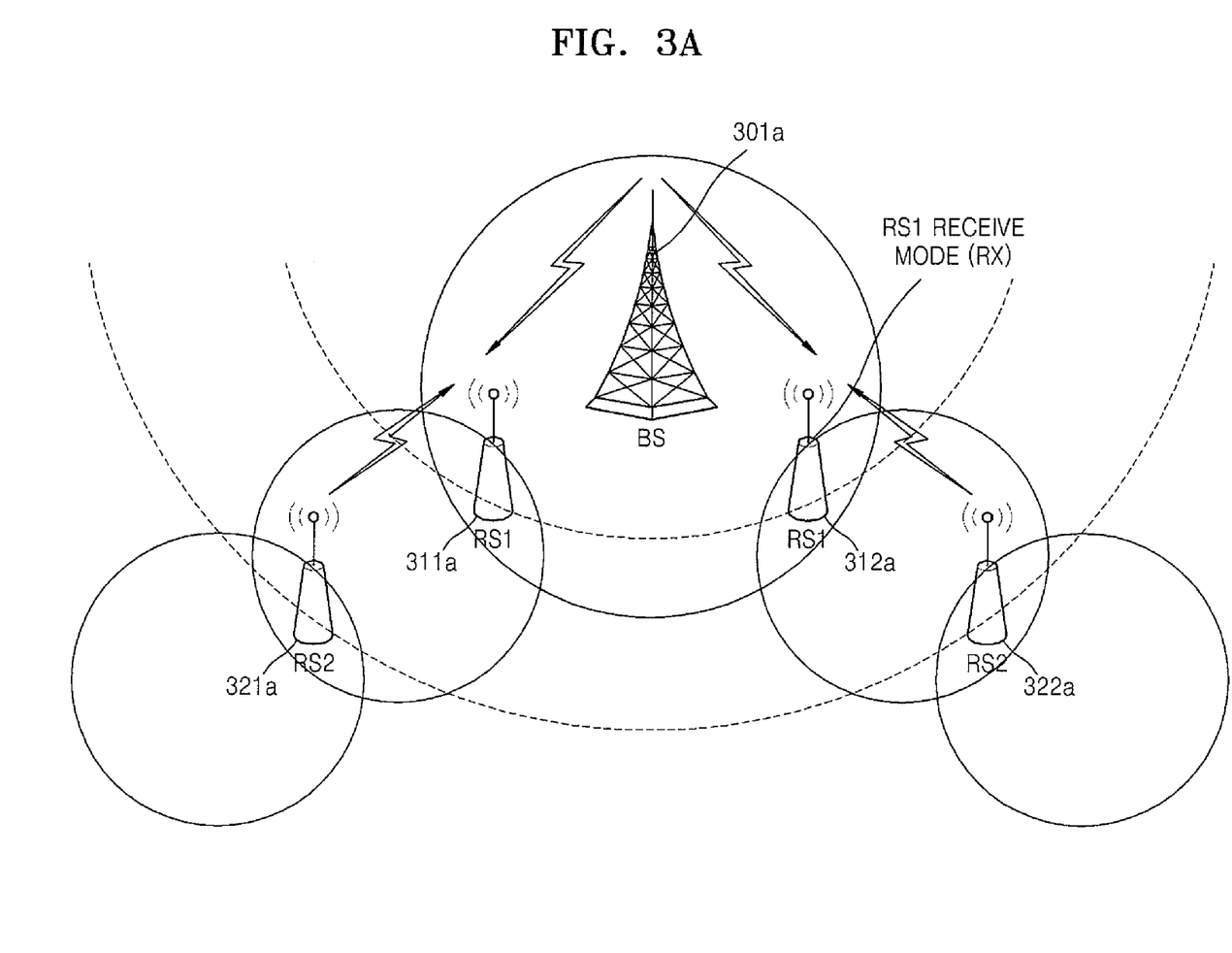
FIGS. 3A and 3B are diagrams illustrating a method of transmitting and receiving data in an MMR system according to an embodiment of the present invention.
Figure 3B:
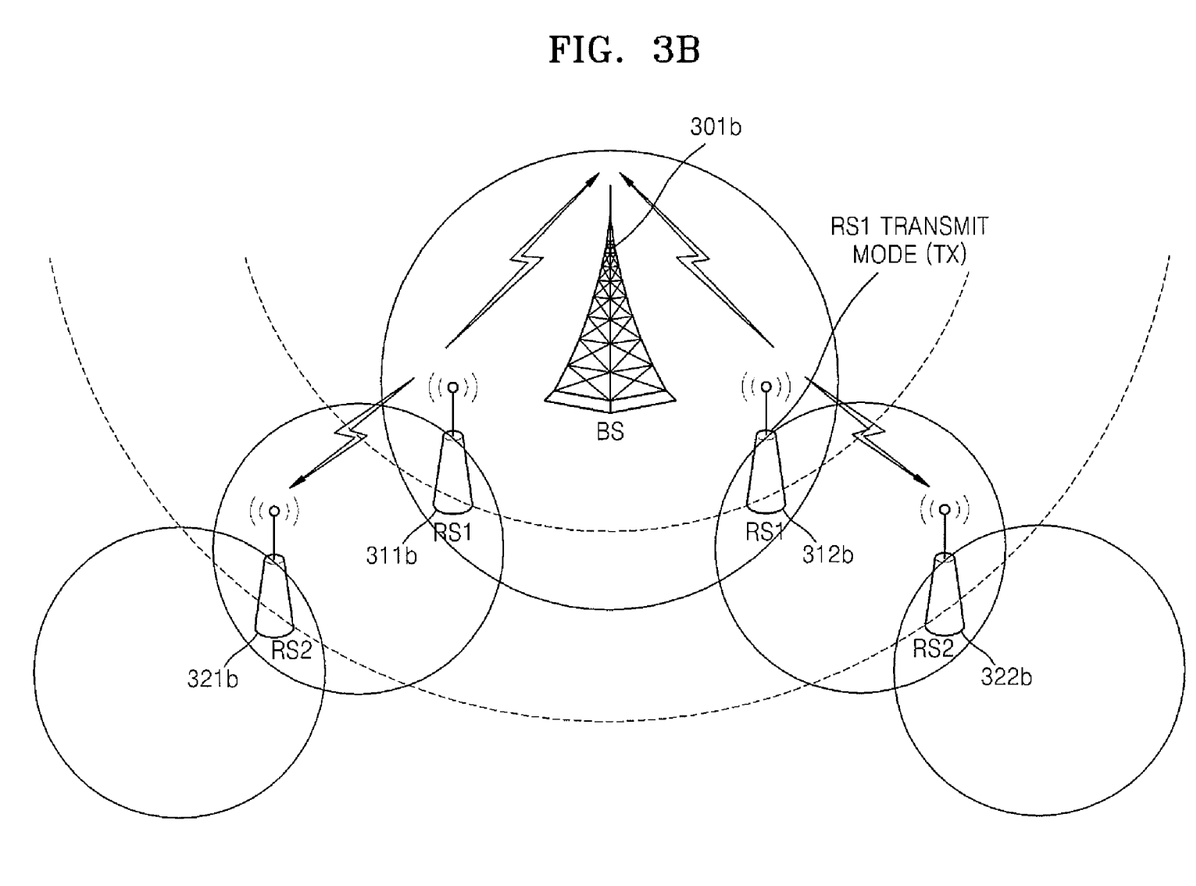

FIGS. 3A and 3B are diagrams illustrating a method of transmitting and receiving data in an MMR system according to an embodiment of the present invention. Based on a base station, FIG. 3A corresponds to the case in which the base station is in a transmit mode, and FIG. 3B corresponds to the case in which the base station is in a receive mode.

According to the method of transmitting and receiving data of the present invention with reference to FIGS. 3A and 3B, when base stations 301a and 301b perform communication with a relay station in a layer 1, the base stations 301a and 301b either transmit data to first relay stations 311a and 312a, and 311b and 312b, respectively, via a specific zone (203a of FIG. 2) of a frame, or receive data from the first relay stations 311a and 312a, and 311b and 312b, respectively, via a specific zone (204a of FIG. 2) of the frame, as illustrated in FIGS. 3A and 3B.

According to the present invention, the first relay stations 311a, 312a, 311b, and 312b operate similarly to the base stations 301a and 301b.

Referring to FIG. 3A, in the case where the first relay stations 311a and 312a are in a mode (a higher layer receive zone: a zone 405 of FIG. 4) for receiving data from the base station 301a, the first relay stations 311a and 312a also operate as a mode (a lower layer receive zone) for receiving data from second relay stations 321a and 322a of a lower layer.

That is, the first relay stations 311a and 312a operate in the mode (the receive zone) for receiving data from both the higher layer (the base station 301a) and the lower layer (the second relay stations 321a and 322a).

Likewise, referring to FIG. 3B, when the first relay stations 311b and 312b are in a mode (a higher layer transmit zone: a zone 406 of FIG. 4) for transmitting data to the base station 301a, the first relay stations 311b and 312b also operate in a mode (a lower layer transmit zone) for transmitting data to the second relay stations 321a and 322a of the lower layer.

That is, the first relay stations 311b and 312b operate in the mode (the transmit mode) for transmitting data to both the higher layer (the base station 301a) and the lower layer (the second relay stations 321a and 322a).

A relay station in the conventional general mobile communication system receives a signal from a base station while simultaneously re-transmitting a signal to a terminal within a range of the relay station. Such a method requires much effort and high costs for separating the receive signal of the relay station from the transmit signal of the relay station.

According to the present invention, when the relay station receives data, the relay station receives the data from both the higher layer and the lower layer. Likewise, when the relay station transmits data, the relay station transmits the data to both the higher layer and the lower layer. By doing so, data reception and data transmission are exclusively performed, and this is the spirit of the present invention. The present invention may be easily applied to not only the two-hop MMR system but also to the multi-hop MMR system.

According to the present invention, in the case of a multi-hop MMR system in which a plurality of relay stations are located at a plurality of layers, when a first relay station is in a receive mode, other relay stations located at all odd layers (e.g., a third relay station, a fifth relay station, and a seventh relay station) operate in a receive mode, and simultaneously, other relay stations located at all even layers (e.g., a second relay station, a fourth relay station, and a sixth relay station) operate in a transmit mode.

Figure 4:
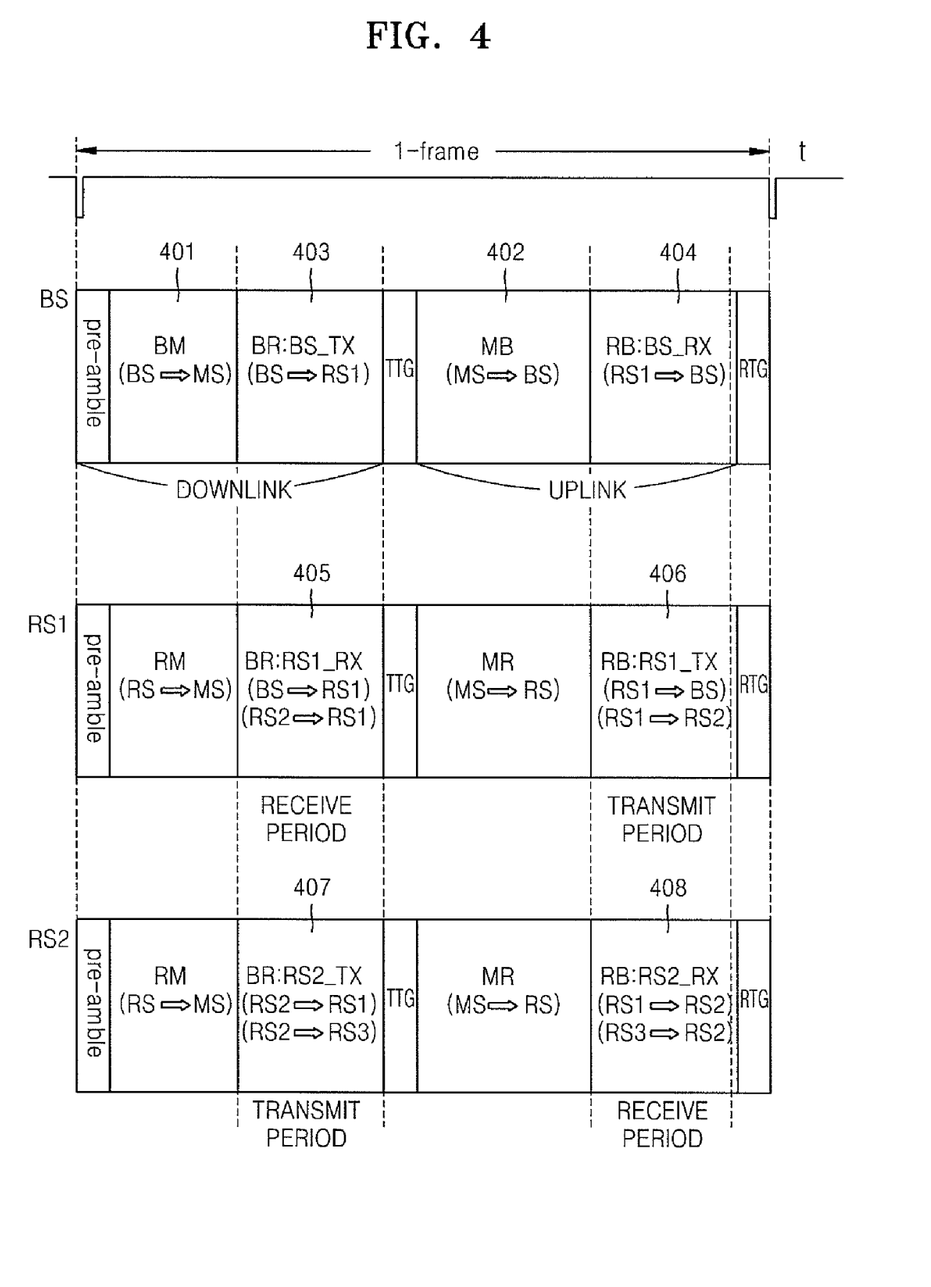
FIG. 4 is a diagram illustrating an MMR frame that is capable of being used for a method of transmitting and receiving data in a multi-hop MMR system, according to an embodiment of the present invention.

FIG. 4 is a diagram illustrating an MMR frame that is capable of being used for a method of transmitting and receiving data in a multi-hop MMR system, according to an embodiment of the present invention.

In order to form a base frame of a base station in an MMR system, a downlink zone is formed of a BM zone (BS→MS zone) 401 in which the base station transmits data to a mobile station, and a BR zone (BS→RS zone) 403 in which the base station transmits a signal to a first relay station.

Also, an uplink zone is formed of an MB zone (MS→BS zone) 402 in which the mobile station transmits a signal to the base station, and an RB zone (RS→BS zone) 404 in which the first relay station transmits a signal to the base station.

First, the case in which the base station transmits data will now be described.

In the BR zone (BS_TX) 403 in which the base station transmits data to the first relay station, the first relay station is set for a receive zone (RS1_RX) 405 for receiving the data.

In the receive zone (RS1_RX) 405 in which the first relay station receives the data from the base station, a second relay station is set for a transmit zone (RS2_TX) 407.

In the BR zone (BS→RS1) 403 in which the base station transmits data to a relay station, when the first relay station operates in a receive mode (a higher layer receive zone), the second relay station operates in a transmit mode so as to transmit necessary data either to the first relay station that is a higher layer, or to a third relay station (a relay station of a next lower layer).

Next, the case in which the base station receives data will now be described.

In the RB zone (BS_RX) 404 in which the base station receives data from the first relay station, the first relay station is set for a transmit zone (RS1_TX) 406 for transmitting data.

In the transmit zone (RS1_TX) 406 in which the first relay station transmits data to the base station, the second relay station is set for a receive zone (RS2_RX) 408 so as to transmit data of the first relay station to the second relay station that is a lower layer.

The first relay station forms the frame of the MMR system by simultaneously transmitting data to both the base station that is the higher layer, and the second relay station that is the lower layer.

A method of forming the MMR frame according to the present invention may be applied to the multi-hop MMR system by setting a frame structure to be identical in relay stations of all odd layers, and also by setting a frame structure to be identical in relay stations of all even layers.

As a result, when communication is performed between the base station and the relay station, and between the relay stations, all odd relay stations simultaneously operate in a transmit mode while all even relay stations simultaneously operate in a receive mode, or all odd relay stations simultaneously operate in a receive mode while all even relay stations simultaneously operate in a transmit mode.

In this manner, according to the present invention, it is possible to simplify the structure of an RF device, and thus, additional functions for performing interference cancellation are not required. Also, the present invention can be easily applied to not only the two-hop MMR system but also the multi-hop MMR system.

According to the present invention, a method of forming a frame is provided, wherein the method can simplify the structure of an RF device, and can be applied to a multi-hop MMR system including three or more hops.

The invention can also be embodied as computer readable codes on a computer readable recording medium. The computer readable recording medium is any data storage device that can store programs or data which can be thereafter read by a computer system. Examples of the computer readable recording medium include magnetic storage media (e.g., ROM, floppy disks, hard disks, etc.), optical recording media (e.g., CD-ROMs, or DVDS), and storage media such as carrier waves (e.g., transmission through the Internet). The computer readable recording medium can also be distributed over network coupled computer systems so that the computer readable code is stored and executed in a distributed fashion.

The present invention involves forming a frame for communication between a base station and a relay station, or between relay stations which are added from a frame structure of a conventional system.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of forming a frame of a relay station in a multi-hop relay system having a plurality of layers from a base station, the method comprising:
    setting the frame of the relay station for a receive zone for simultaneously receiving data from stations at a higher layer and a lower layer within the same receive zone, and for a transmit zone for simultaneously transmitting data to the stations located at the higher layer and the lower layer within the same transmit zone.

2. The method of claim 1, further comprising, when the relay station is located at an odd layer from a base station:
    setting the frame of the relay station for the receive zone in a downlink zone; and
    setting the frame of the relay station for the transmit zone in an uplink zone.

3. The method of claim 1, further comprising, when the relay station is located at an even layer from a base station:
    setting the frame of the relay station for the transmit zone in a downlink zone; and
    setting the frame of the relay station for the receive zone in an uplink zone.

4. A relay station in a multi-hop relay system having a plurality of layers, the relay station setting a frame of the relay station for a receive zone for simultaneously receiving data from stations located at a higher layer and a lower layer within the same receive zone, and for a transmit zone for simultaneously transmitting data to the stations located at the higher layer and the lower layer within the same transmit zone.

5. The relay station of claim 4, when the relay station is located at an odd layer from a base station, the relay station setting the frame of the relay station for the receive zone in a downlink zone, and setting the frame of the relay station for the transmit zone in an uplink zone.

6. The relay station of claim 4, when the relay station is located at an even layer from a base station, the relay station setting the frame of the relay station for the transmit zone in a downlink zone, and setting the frame of the relay station for the receive zone in an uplink zone.

7. A method of forming a frame of a relay station in a multi-hop relay Time Division Duplex system having a plurality of layers, the method comprising:

setting the Time Division Duplex frame of the relay station for one of a receive zone for simultaneously receiving data from a higher layer located at a relay station and a lower layer located at a second relay station, and for a transmit zone for simultaneously transmitting data to the higher layer and the lower layer.

8. The method of claim 7, further comprising, when the relay station is located at an odd layer from a base station:

setting the frame of the relay station for the receive zone in a downlink zone; and setting the frame of the relay station for the transmit zone in an uplink zone.

9. The method of claim 7, further comprising, when the relay station is located at an even layer from a base station:

setting the frame of the relay station for the transmit zone in a downlink zone; and setting the frame of the relay station for the transmit zone in an uplink zone.

* * * * *